Patented Nov. 17, 1925.

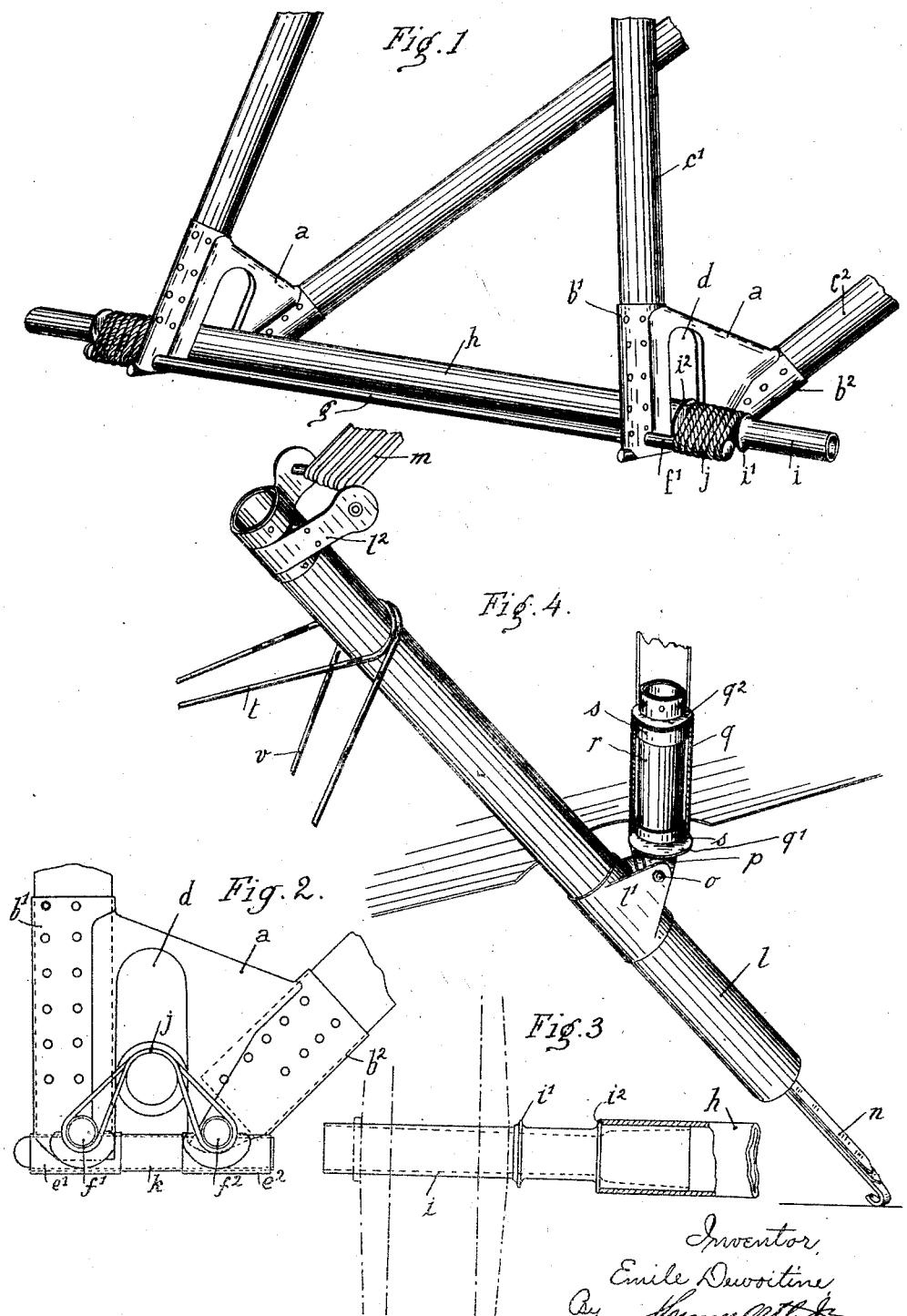

1,561,698

UNITED STATES PATENT OFFICE.

EMILE DEWOITINE, OF TOULOUSE, FRANCE.

LANDING CHASSIS AND TAIL SKID FOR AEROPLANES.

Application filed July 8, 1924. Serial No. 724,857.

*To all whom it may concern:*

Be it known that I, EMILE DEWOITINE, a citizen of France, and a resident of Toulouse, Haute-Garonne, France, have invented certain new and useful Improvements in Landing Chassis and Tail Skids for Aeroplanes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a method of assembling the struts in a landing chassis wherein the parts are mounted with greater facility, and the axle tube as well as the elastic element formed by the shock absorbers are more rapidly placed in position.

The invention has further for its object a pivoting tail skid which is revoluble upon two axes at right angles to each other and can thus assume all suitable positions according to the requirements, an elastic arrangement being provided for damping the motion of the skid in all directions.

The following description, together with the appended drawings which are given by way of example, shows various embodiments of the said invention.

Fig. 1 is a perspective view of the landing chassis.

Fig. 2 is a side view of the same.

Fig. 3 shows the axle spindle of the said chassis.

Fig. 4 is a perspective view of the tail skid.

As shown in Fig. 1, the landing chassis is symmetrical with reference to the middle vertical plane of the aeroplane, and the following description will therefore relate only to one-half of the device. The assembling arrangement according to the said invention consists essentially of a steel connecting shell $a$ which is secured by autogenous welding to the two tubular sockets $b^1$ $b^2$ surrounding the struts $c^1$ $c^2$ of the landing chassis. The said connecting shell $a$ is cut out at the middle part at $d$ and is open at the bottom; said member serves to allow the movement of the axle while limiting the same in case the action of the rubber shock absorbers should prove insufficient. At the lower part of the device formed by the shell $a$ and the sockets $b^1$ $b^2$ are provided on either side of the slot $d$ the tubular members $e^1$ $e^2$, Fig. 2, situated in line with each other and cooperating with the fastening bolt $k$, as will be further set forth.

Further, the two parallel studs or pins $f^1$ $f^2$ are welded to the said shell and traverse the same, being attached to a tube $g$ forming a cross-bracing member; the said studs constitute stationary attaching points, and the india rubber shock absorber $j$ is wound thereon, Fig. 2. The axle carrying the landing wheels may consist as shown in Fig. 3 of a central tube $h$ of large diameter and small thickness, into whose ends are fitted the steel axle spindles $i$; each spindle comprises two shoulders $i^1$ $i^2$ for maintaining the said shock absorbers, and a cylindrical portion $i$ engaging the wheel hub, shown in the dot and dash lines in Fig. 3. Each spindle is fitted into the tube $h$ and is riveted by operating through its end which remains open.

The said landing chassis is mounted in the following manner. The element $a$ $b^1$ $b^2$ fitted upon the struts $c^1$ $c^2$ is riveted thereto by operating through the upper end of the struts which remains open; the shock absorbers $j$ are then wound upon the studs $f^1$ $f^2$; the axle $h$ is inserted through the bottom of the slots $d$, exercising an upward pressure so as to increase the length of the shock absorbers mounted upon the spindles $i$ between the shoulders $i^1$ $i^2$ Fig. 2. It will then suffice to insert into the two tubular members $e^1$ $e^2$ a suitable section of tube which thus forms a fastening bolt $k$, Fig. 2. The device is taken apart by proceeding in the contrary manner, first removing the bolt $k$. It is observed that this operation can be performed without removing the said shock absorbers; moreover, by reason of the double support formed by the tubes $f^1$ and $f^2$, the shock absorber cord can be wound in parallel turns without overlapping and without cross-bracing.

A tail skid as shown in Fig. 4 may be provided, in combination or not with the said landing chassis, it being essentially composed of an elongated member $l$ having a suitable form; prismatic, cylindrical, tubular or the like, and made of suitable material such as wood or metal; at the middle part of the said member is mounted a forked connecting piece $l^1$ and at the top a strap $l^2$ having secured thereto the elastic element consisting of the india rubber shock absorbers m; at the lower end of the skid are disposed the spring strips n coming into contact with the ground and immediately absorbing a certain part of the shock. The forked piece $l^1$ which forms a fixed support for the skid has pivoted thereto by means of the horizontal axle o a connecting member p which is mounted upon a vertical tube r revoluble within the coaxial tube q secured to the aeroplane body. The tube q has a smaller diameter than the tube r, and between the said tubes are disposed two gun-metal friction rings which are fitted by tight friction upon the tube r. Two suitable stop-pieces prevent any lengthwise motion of the tube q, the lower stop-piece $q^1$ being formed by the turning process upon the tube q itself, whereas the upper stop piece $q^2$ is riveted to the said tube q. But like arrangements may be obviously employed for the purpose.

The principal component of the force of the impulse produced when landing will be situated in the plane of symmetry of the aeroplane body. The upper strap is so disposed that the strands m can be wound thereon parallel to its plane of symmetry. However, in the event of landing sidewise, the skid will tend to leave this plane of symmetry and the shock absorbers t and v are disposed at either side of the skid, being looped around the latter, so as to automatically bring the skid into the said plane.

Obviously, the said arrangements are susceptible of various detail modifications without departing from the spirit of the invention.

What I claim is:—

1. A landing chassis for aeroplanes, comprising an axle carrying the landing wheels, struts secured to the aeroplane body, fittings assembling the ends of the said struts, said fittings having therein suitable slots open at the bottom, rods or studs disposed on either side of the said slot and perpendicular to the said fittings, elastic means connecting the ends of axle inserted into the slot with the said studs disposed on either side of the slot, and means closing the opening at the bottom of the said slot.

2. A landing chassis for aeroplanes, comprising an axle carrying the landing wheels, struts secured to the aeroplane body, fittings assembling the ends of the said struts, said fittings having therein suitable slots open at the bottom, rods or studs disposed on either side of the said slot and perpendicular to the said fittings, elastic shock absorbers wound upon the said rods disposed on either side of the slot, in such manner that the axle inserted into the slot through the opening in the bottom of the same shall drive up the said shock absorbers passing over the axle, and a metal rod inserted into sockets attached to the said fitting in order to close the opening of the slot into which the said axle has been inserted.

3. A landing chassis for aeroplanes, consisting of a tube of large diameter, wheel spindles fitted into and riveted to the ends of the said tube, thus constituting an axle for carrying the wheels, struts secured to the aeroplane body, fittings assembling the ends of the said struts, said fittings having therein suitable slots open at the bottom, rods or studs disposed on either side of the said slot and perpendicular to the said fittings, and elastic means connecting the ends of the axle inserted into the slot with the said studs disposed on either side of the slot, and means closing the opening in the bottom of the said slot.

In testimony that I claim the foregoing as my invention, I have signed my name hereto.

EMILE DEWOITINE.